Patented Jan. 8, 1924.

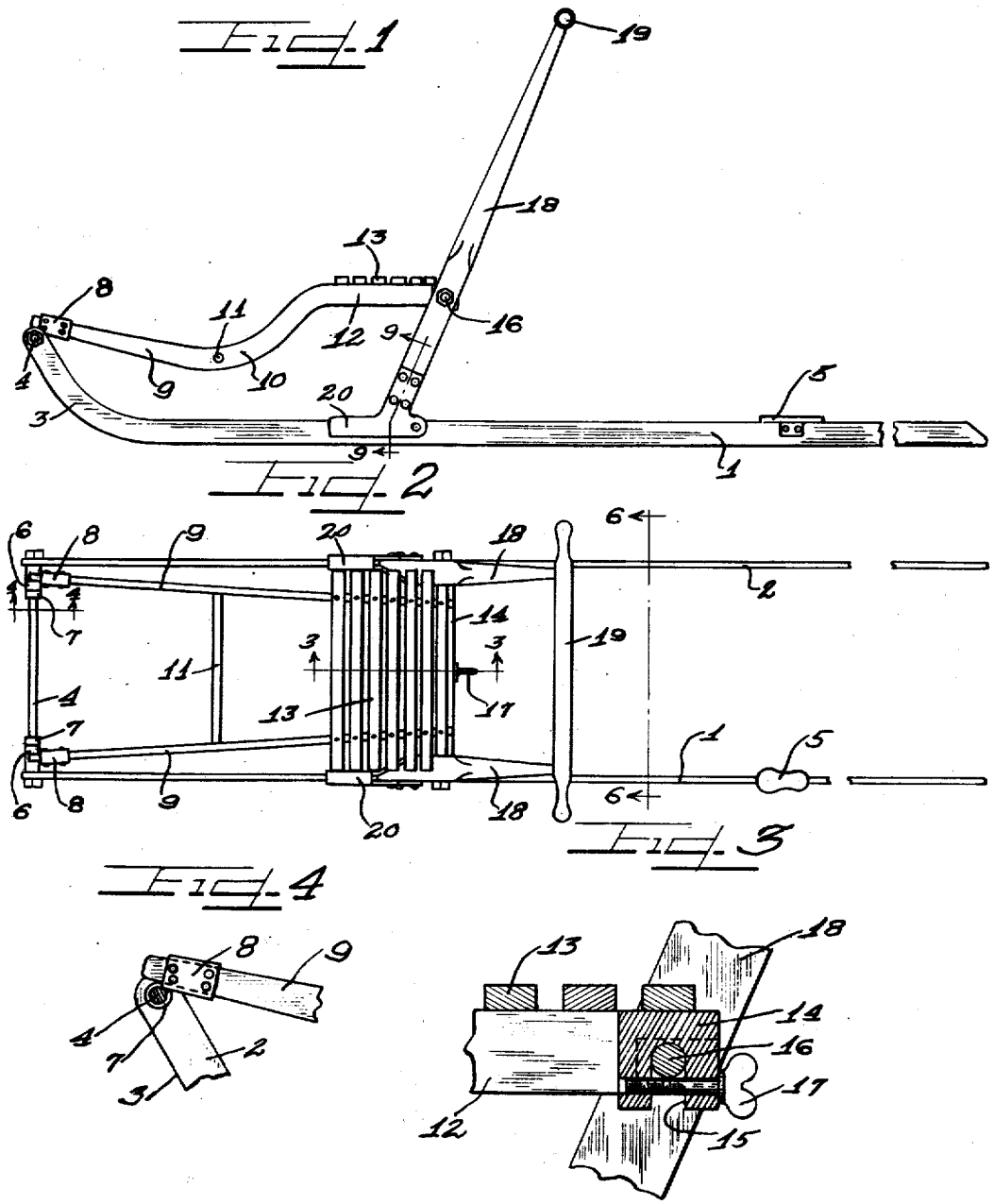

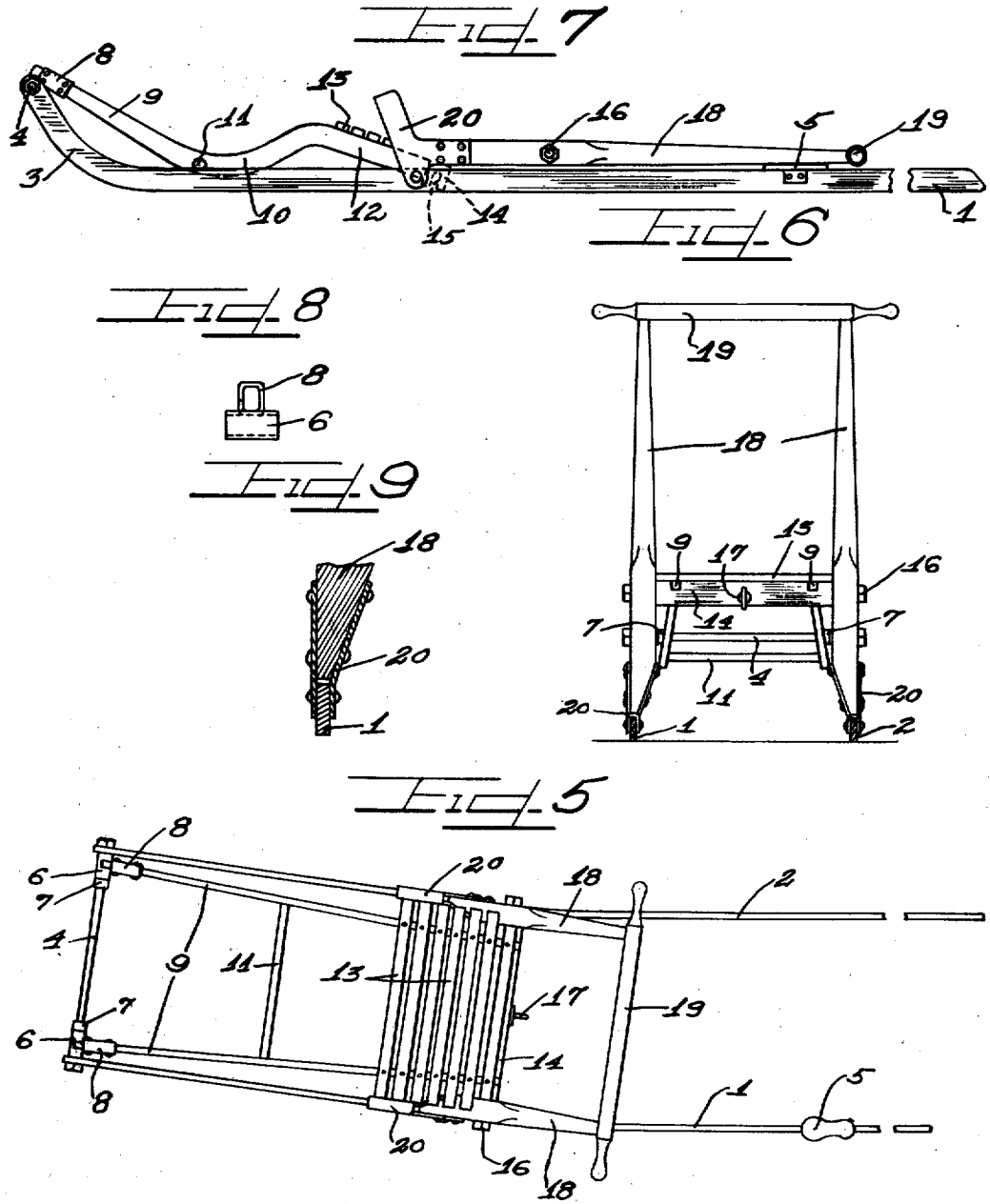

UNITED STATES PATENT OFFICE.

VICTOR E. PEARSON, OF CHICAGO, ILLINOIS.

SPORT SLED.

Application filed December 5, 1921. Serial No. 520,118.

*To all whom it may concern:*

Be it known that I, VICTOR E. PEARSON, a citizen of the United States, and a resident of the city of Chicago, in the county of Cook and State of Illinois, have invented certain new and useful Improvements in a Sport Sled; and I do hereby declare that the following is a full, clear, and exact description of the same, reference being had to the accompanying drawings, and to the numerals of reference marked thereon, which form a part of this specification.

This invention relates to an improved type of a collapsible sport sled wherein a seat is supported on long flexible runners which are turned on edge and are adapted to have the forward ends thereof deflected by using the back of the seat as a steering means.

It is an object of this invention to provide a sport sled having flexible runners turned on edge.

It is also an object of the invention to provide a sport sled wherein the steering is done by means of the back of a seat supported on the sled runners.

Another object of the invention is to provide a push sled having a collapsible seat and a foot plate on the runners.

It is an important object of this invention to provide a simple and effective sport sled adapted to be pushed by means of a seat back which also serves as a steering means for deflecting the forward ends of flexible steel runners on which the seat is mounted.

Other and further important objects of this invention will be apparent from the disclosures in the specification and drawings.

The invention (in a preferred form) is illustrated in the drawings and hereinafter more fully described.

On the drawings:

Figure 1 is a side elevation of a sport sled embodying the principles of this invention.

Figure 2 is a top plan view thereof.

Figure 3 is an enlarged fragmentary detail section taken on line 3—3 of Figure 2.

Figure 4 is an enlarged fragmentary sectional view taken on line 4—4 of Figure 2.

Figure 5 is a top plan view of the sled showing the front portions of the runners deflected for steering the sled.

Figure 6 is a view taken on line 6—6 of Figure 2.

Figure 7 is a side elevation of the sled in collapsed form.

Figure 8 is a front elevation of one of the connectors used for connecting the seat sills to the cross shaft connecting the runners.

Figure 9 is a fragmentary detail section taken on line 9—9 of Figure 1.

As shown on the drawings:

The reference numerals 1 and 2 indicate a pair of flexible steel runners curved upwardly at their forward ends at 3 and resting on their lower narrow edges. The upturned front ends of the long runners are connected by means of a connecting bolt or shaft 4. Securely fastened to the runner 1 is a foot plate 5.

Pivotally engaged on the shaft 4 adjacent the inner sides of the front ends of the runners 1 and 2 is a pair of connector sleeves 6 held in place by means of collars 7 secured to said shaft. Integrally formed at right angles on each sleeve 6 is a sleeve 8. Projecting through the connector sleeves 8 are the front ends of a pair of seat sills 9, the front ends of which are rigidly secured in said sleeves 8 by rivets, bolts or other suitable means. The seat sills are curved at 10 and converge. Said sills are connected by a transverse cross bar or foot rest 11. The rear ends 12 of the sills 9 are straight and are connected by a plurality of parallel strips or bars to form a seat 13. Securely connecting the rear ends of the sills 9 is a cross brace or bar 14 provided with a longitudinal groove 15 in the bottom thereof to permit the brace bar 14 to be removably engaged over a seat supporting rod 16. A thumb screw 17 removably projects into the cross bar 14 beneath the rod 16 to hold the seat locked in position for use. The rod 16 is supported by two chair back side bars or stiles 18. The upper ends of the stiles 18 are connected by a handle bar 19. The lower ends of the stiles 18 are rigidly secured in metal shoes 20 which are pivotally attached to the runners 1 and 2. The stiles 18 and the handle bar 19 form the back of the chair.

The operation is as follows:

When the sled is not in use, it may be collapsed as illustrated in Figure 7. This is done by merely removing the screw 17 and lifting the seat off of the supporting rod 16. When this is done, the back 18—19 drops rearwardly by gravity upon the runners 1 and 2. The seat is permitted to swing downwardly about the shaft or rod 4. It will thus be seen that the sled when not in use may be stored away in a small space when collapsed.

To use the sled, the seat and back are lifted and the grooved cross bar 14 is engaged on the supporting rod 16, as shown in Figure 3. The screw 17 is then turned into position to hold the chair assembled.

A person may sit on the seat 13, using the rod 11 for a foot rest, if desired. A second person is required to push the sled by means of the chair back handle 19. The rear ends of the runners extend quite a distance behind the chair and as already described, run on their narrow edges. The person pushing the sled runs between the runners and may use the foot plate 5 for a rest for one foot while the other foot is used to push the sled. When it becomes necessary to steer the sled, a turning stress is applied to the handle 19, thereby causing the chair back stiles 18 to flex the front ends of the runners, as shown in Figure 5, or in the opposite direction. The long runners being set on edge and constructed of flexible steel, are easily operable by means of the chair back.

I am aware that many changes may be made, and numerous details of construction may be varied through a wide range without departing from the principles of this invention, and I therefore do not purpose limiting the patent granted hereon, otherwise than is necessitated by the prior art.

I claim as my invention:

A sled comprising a pair of long flexible metal runners set on edge, a chair seat pivotally supported on the front ends of said runners, a chair back pivotally supported on said runners adapted to support the seat, and a cross-bar connecting the side members of the seat back, a U-shaped member at the rear edge of the seat adapted to engage said cross-bar and means for releasably holding said cross-bar and U-shaped member in engaging position.

In testimony whereof I have hereunto subscribed my name in the presence of two subscribing witnesses.

VICTOR E. PEARSON.

Witnesses:
 FRED E. PAESLER,
 JAMES M. O'BRIEN.